United States Patent
Aleksic et al.

(10) Patent No.: US 12,080,290 B2
(45) Date of Patent: Sep. 3, 2024

(54) DETERMINING DIALOG STATES FOR LANGUAGE MODELS

(71) Applicant: Google LLC, Mountain View, CA (US)

(72) Inventors: Petar Aleksic, Jersey City, NJ (US); Pedro Jose Moreno Mengibar, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/650,567

(22) Filed: Feb. 10, 2022

(65) Prior Publication Data
US 2022/0165270 A1    May 26, 2022

Related U.S. Application Data

(63) Continuation of application No. 16/732,645, filed on Jan. 2, 2020, now Pat. No. 11,264,028, which is a (Continued)

(51) Int. Cl.
*G10L 15/22* (2006.01)
*G06F 40/295* (2020.01)
(Continued)

(52) U.S. Cl.
CPC ............ *G10L 15/22* (2013.01); *G06F 40/295* (2020.01); *G06F 40/30* (2020.01); *G10L 15/26* (2013.01);
(Continued)

(58) Field of Classification Search
CPC ..................................................... G10L 15/22
See application file for complete search history.

(56) References Cited

U.S. PATENT DOCUMENTS

6,173,261 B1 *   1/2001   Arai .................. G06F 40/253
                                              704/251
7,533,020 B2 *   5/2009   Arnold ............... G10L 15/183
                                              704/257
(Continued)

FOREIGN PATENT DOCUMENTS

WO        2014204655 A1    12/2014

OTHER PUBLICATIONS

"Adaptive Categorical Understanding for Spoken Dialogue System" Narayanan et. al May 1, 2005.
(Continued)

*Primary Examiner* — Douglas Godbold
(74) *Attorney, Agent, or Firm* — Honigman LLP; Brett A. Krueger; Grant Griffith

(57) ABSTRACT

Systems, methods, devices, and other techniques are described herein for determining dialog states that correspond to voice inputs and for biasing a language model based on the determined dialog states. In some implementations, a method includes receiving, at a computing system, audio data that indicates a voice input and determining a particular dialog state, from among a plurality of dialog states, which corresponds to the voice input. A set of n-grams can be identified that are associated with the particular dialog state that corresponds to the voice input. In response to identifying the set of n-grams that are associated with the particular dialog state that corresponds to the voice input, a language model can be biased by adjusting probability scores that the language model indicates for n-grams in the set of n-grams. The voice input can be transcribed using the adjusted language model.

20 Claims, 7 Drawing Sheets

Related U.S. Application Data continuation of application No. 15/983,768, filed on May 18, 2018, now Pat. No. 10,553,214.

(51) Int. Cl.
   *G06F 40/30* (2020.01)
   *G10L 15/26* (2006.01)
   *G10L 15/065* (2013.01)
   *G10L 15/183* (2013.01)
   *G10L 15/197* (2013.01)

(52) U.S. Cl.
   CPC .......... *G10L 15/065* (2013.01); *G10L 15/183* (2013.01); *G10L 15/197* (2013.01)

(56) References Cited

U.S. PATENT DOCUMENTS

| | | | | |
|---|---|---|---|---|
| 8,370,143 | B1* | 2/2013 | Coker | G06F 40/274 704/240 |
| 8,965,763 | B1* | 2/2015 | Chelba | G10L 15/063 704/235 |
| 9,009,025 | B1* | 4/2015 | Porter | G10L 15/197 704/251 |
| 9,460,713 | B1* | 10/2016 | Moreno Mengibar | G10L 15/07 |
| 9,473,637 | B1* | 10/2016 | Venkatapathy | G06F 40/216 |
| 2003/0091163 | A1* | 5/2003 | Attwater | G10L 15/1822 704/231 |
| 2003/0149561 | A1* | 8/2003 | Zhou | G10L 15/26 704/E15.04 |
| 2004/0162724 | A1* | 8/2004 | Hill | G10L 15/1822 704/231 |
| 2006/0095268 | A1* | 5/2006 | Yano | G10L 15/22 704/E15.04 |
| 2007/0198272 | A1* | 8/2007 | Horioka | G10L 15/22 704/E15.04 |
| 2008/0177541 | A1* | 7/2008 | Satomura | G10L 15/26 704/E15.044 |
| 2009/0228264 | A1* | 9/2009 | Williams | H04M 3/493 704/9 |
| 2011/0010164 | A1* | 1/2011 | Williams | G06F 40/56 704/9 |
| 2011/0161080 | A1* | 6/2011 | Ballinger | G06F 3/04886 704/235 |
| 2012/0265528 | A1* | 10/2012 | Gruber | G10L 15/183 704/235 |
| 2013/0275164 | A1* | 10/2013 | Gruber | G10L 17/22 705/5 |
| 2015/0038204 | A1 | 2/2015 | Dugan et al. | |
| 2015/0051910 | A1* | 2/2015 | Lavallee | G10L 15/063 704/245 |
| 2015/0073798 | A1* | 3/2015 | Karov | G06F 16/36 704/243 |
| 2015/0309984 | A1* | 10/2015 | Bradford | G06F 40/263 704/8 |
| 2015/0348551 | A1* | 12/2015 | Gruber | G10L 15/1822 704/235 |
| 2015/0356969 | A1* | 12/2015 | Lee | G10L 15/14 704/245 |
| 2015/0370531 | A1* | 12/2015 | Faaborg | G10L 15/26 704/275 |
| 2015/0382047 | A1* | 12/2015 | Van Os | H04N 21/25891 725/38 |
| 2016/0091967 | A1* | 3/2016 | Prokofieva | G06F 3/167 345/156 |
| 2016/0133250 | A1* | 5/2016 | Czahor | G06F 40/58 704/257 |
| 2016/0241493 | A1* | 8/2016 | Sharp | G06Q 10/107 |
| 2016/0253990 | A1* | 9/2016 | Master | G06F 40/289 704/9 |
| 2016/0284346 | A1* | 9/2016 | Visser | G10L 25/30 |
| 2016/0365092 | A1* | 12/2016 | Moreno Mengibar | G10L 15/197 |
| 2017/0004829 | A1* | 1/2017 | Kurisu | G10L 15/22 |
| 2017/0069327 | A1* | 3/2017 | Heigold | G10L 17/04 |
| 2017/0228366 | A1* | 8/2017 | Bui | G06F 40/247 |
| 2019/0155905 | A1* | 5/2019 | Bachrach | G06F 40/30 |

OTHER PUBLICATIONS

"Adaptive Language Models for Spoken Dialogue Systems" Roger Argiles Solsona et. al May 13, 2002.
European Search Report for the EP application No. 23179644.2.

* cited by examiner

DETERMINING DIALOG STATES FOR LANGUAGE MODELS

CROSS-REFERENCE TO RELATED APPLICATION

This patent application is a continuation of, and claims priority under 35 U.S.C. § 120 from, U.S. patent application Ser. No. 16/732,645, filed on Jan. 2, 2020, which is a continuation of U.S. patent application Ser. No. 15/983,768, filed on Mar. 18, 2018, which is a continuation of U.S. patent application Ser. No. 15/071,651, filed on Mar. 16, 2016. The disclosures of these prior applications are considered part of the disclosure of this application and are hereby incorporated by reference in their entireties.

TECHNICAL FIELD

This document generally relates to computer-based speech recognition, and more particularly to biasing language models based on dialog states.

BACKGROUND

Increasingly, computing devices are provided with the capability to receive spoken user input in addition to or alternatively to typed input. Voice assistant applications, for example, may determine tasks to perform on a device based on multi-stage dialogs of prompts and spoken responses between the voice assistant and a user. Likewise, web browsers and other applications on some devices are arranged to receive voice inputs in form fields to obviate the need for a user to type input into the fields. Voice inputs provided by a user to a computing device may be processed by a speech recognizer. The speech recognizer may include components such as an acoustic model and a language model that are collectively configured to transcribe voice inputs to text.

SUMMARY

Systems, methods, devices, and other techniques are described herein for determining dialog states that correspond to voice inputs and for biasing a language model based on the determined dialog states. In some implementations, a speech recognition system may automatically learn a set of dialog states and a respective language model biasing mode for each respective dialog state. The dialog states and biasing modes may be determined without being predefined by a user.

Some implementations of the subject matter described herein include a computer-implemented method. The method can include receiving, at a computing system, audio data that indicates a voice input and determining a particular dialog state, from among a plurality of dialog states, which corresponds to the voice input. A set of n-grams can be identified that are associated with the particular dialog state that corresponds to the voice input. The set of n-grams can be associated with the particular dialog state based at least on n-grams in the set of n-grams occurring frequently in historical voice inputs that correspond to the dialog state. In response to identifying the set of n-grams that are associated with the particular dialog state that corresponds to the voice input, a language model can be biased by adjusting probability scores that the language model indicates for n-grams in the set of n-grams. The voice input can be transcribed using the adjusted language model.

These and other implementations can optionally include one or more of the following features.

The plurality of dialog states can respectively indicate a plurality of stages of user voice interactions with a computing device that pertain to a particular task.

The computing system may receive a second voice input and may determine a second particular dialog state, from among the plurality of dialog states, which corresponds to the second voice input. A second set of n-grams can be identified that are associated with the second particular dialog state that corresponds to the second voice input. The second set of n-grams can be different than the set of n-grams that are associated with the particular dialog state that corresponds to the voice input.

Determining the particular dialog state that corresponds to the voice input can include: identifying a second particular dialog state, from among the plurality of dialog states, that corresponds to a second voice input that preceded the voice input, wherein the voice input and the second voice input each pertains to a same task; and determining the particular dialog state that corresponds to the voice input based on data that indicates one or more dialog states among the plurality of dialog states that are likely to occur after the second particular dialog state.

Determining the particular dialog state that corresponds to the voice input can include generating a transcription of the voice input and determining a match between one or more n-grams that occur in the transcription of the voice input and one or more n-grams in the set of n-grams that are associated with the particular dialog state.

Determining the match can include determining a semantic relationship between the one or more n-grams that occur in the transcription of the voice input and the one or more n-grams in the set of n-grams that are associated with the particular dialog state.

Data can be received that indicates a context associated with the voice input. Determining the particular dialog state that corresponds to the voice input can include identifying the particular dialog state based on the context associated with the voice input.

The context associated with the voice input can include data that characterizes a display of a user interface at a computing device at which the voice input was received at a time that the voice input was received. Identifying the particular dialog state based on the context associated with the voice input can include identifying the particular dialog state based on the data that characterizes the display of the user interface at the computing device at which the voice input was received at the time the voice input was received.

An application identifier can be received at the computing system that indicates an application to which the voice input was directed at a computing device. The plurality of dialog states can pertain to an application-specific task for the application to which the voice input was directed.

Some implementations of the subject matter described herein include another computer-implemented method. The method can include obtaining a plurality of transcriptions of voice inputs that correspond to different states in a multi-state dialog. For each transcription among the plurality of transcriptions, a set of n-grams that occur in the transcription can be identified. A plurality of groups of transcriptions can be generated by assigning to each of the groups a respective subset of transcriptions among the plurality of transcriptions for which the identified sets of n-grams are determined to be related. Based on the plurality of groups of transcriptions, a model can be determined that indicates a plurality of dialog states that occur in the multi-state dialog and a respective set of n-grams associated with each dialog state. The determined model can be provided to bias a language model that is used in a speech recognition process.

These and other implementations can optionally include one or more of the following features.

A plurality of dialog states can be determined by assigning each of the groups in the plurality of groups of transcriptions to a respective dialog state among the plurality of dialog states such that each of the plurality of dialog states corresponds to a respective subset of the groups of transcriptions and the respective subsets of the groups of transactions for each of the plurality of dialog states are different from each other. The respective set of n-grams associated with each dialog state among the plurality of dialog states can be selected based on the identified sets of n-grams that occur in transcriptions in the respective subset of the groups of transcriptions that correspond to the dialog state.

A first dialog state among the plurality of dialog states can correspond to a first subset of the groups of transcriptions that includes two or more of the groups of transcriptions.

Generating the plurality of groups of transcriptions can include forming groups of transcriptions that are determined be semantically similar to each other.

The computing system can receive data that indicates an order that at least some of the voice inputs were submitted in the multi-state dialog. Based at least on the data that indicates the order that the at least some of the voice inputs were submitted in the multi-state dialog, a sequence of the dialog states in the plurality of dialog states can be determined. The sequence information can indicate, for each respective dialog state, one or more other dialog states that follow the respective dialog state or one or more other dialog states that precede the respective dialog state.

The plurality of transcriptions of voice inputs can include, for each respective dialog state among the plurality of dialog states in the multi-state dialog, multiple transcriptions of voice inputs that correspond to the respective dialog state among the plurality of dialog states.

The computing system can receive data that indicates respective contexts associated with the voice inputs that correspond to at least some of the plurality of transcriptions. Generating the plurality of groups of transcriptions can include grouping transcriptions further based on the data that indicates the respective contexts associated with the voice inputs that correspond to the at least some of the plurality of transcriptions.

The respective context associated with a first voice input that corresponds to a first transcription among the plurality of transcriptions can include data that characterizes a display of a user interface at a computing device at which the first voice input was received at the time that the first voice input was received.

Some implementations of the subject matter described herein can include a computing system. The computing system may include one or more processors and one or more computer-readable media. The computer-readable media store instructions that, when executed, cause performance of operations that include receiving audio data that indicates a voice input; determining a particular dialog state, from among a plurality of dialog states, that corresponds to the voice input; identifying a set of n-grams that are associated with the particular dialog state that corresponds to the voice input, wherein the set of n-grams are associated with the particular dialog state based at least on n-grams in the set of n-grams occurring frequently in historical voice inputs that correspond to the dialog state; in response to identifying the set of n-grams that are associated with the particular dialog state that corresponds to the voice input, adjusting a language model by increasing probability scores indicated by the language model of n-grams in the set of n-grams; and transcribing the voice input using the adjusted language model.

In some implementations, the techniques described herein may, in certain instances, realize one or more of the following advantages. A speech recognizer may generate more accurate transcriptions of voice inputs using a language model that is biased based on dialog states determined to correspond to the voice inputs. Moreover, the dialog states that occur in a human-machine dialog may be autonomously determined by a computing system so that application developers need not keep track of dialog states in their respective applications or provide dialog state identifiers to a speech recognition system that transcribes voice inputs for the respective applications. In some implementations, a computing system can determine respective sets of n-grams associated with a plurality of dialog states based on analysis of historical voice inputs and transcriptions. The sets of n-grams may be used to bias a language model in different ways based on which dialog state is detected for a given transcription request. Beneficially, in some implementations, these techniques may eliminate the need for application developers to manually provide the sets of n-grams associated with each dialog state to a speech recognition system.

DESCRIPTION OF DRAWINGS

Like reference symbols in the various drawings indicate like elements.

DETAILED DESCRIPTION

This document generally describes systems, methods, devices, and other techniques for identifying and using dialog states to bias language models, such as language models that may be used by a speech recognizer to transcribe a voice input to text. Techniques are described, for example, for automatically determining dialog states and n-grams without an application or application developer explicitly identifying the dialog state or n-grams associated with a given voice input transcription request. These techniques and others are described in further detail with respect to the figures.

Figure 1:
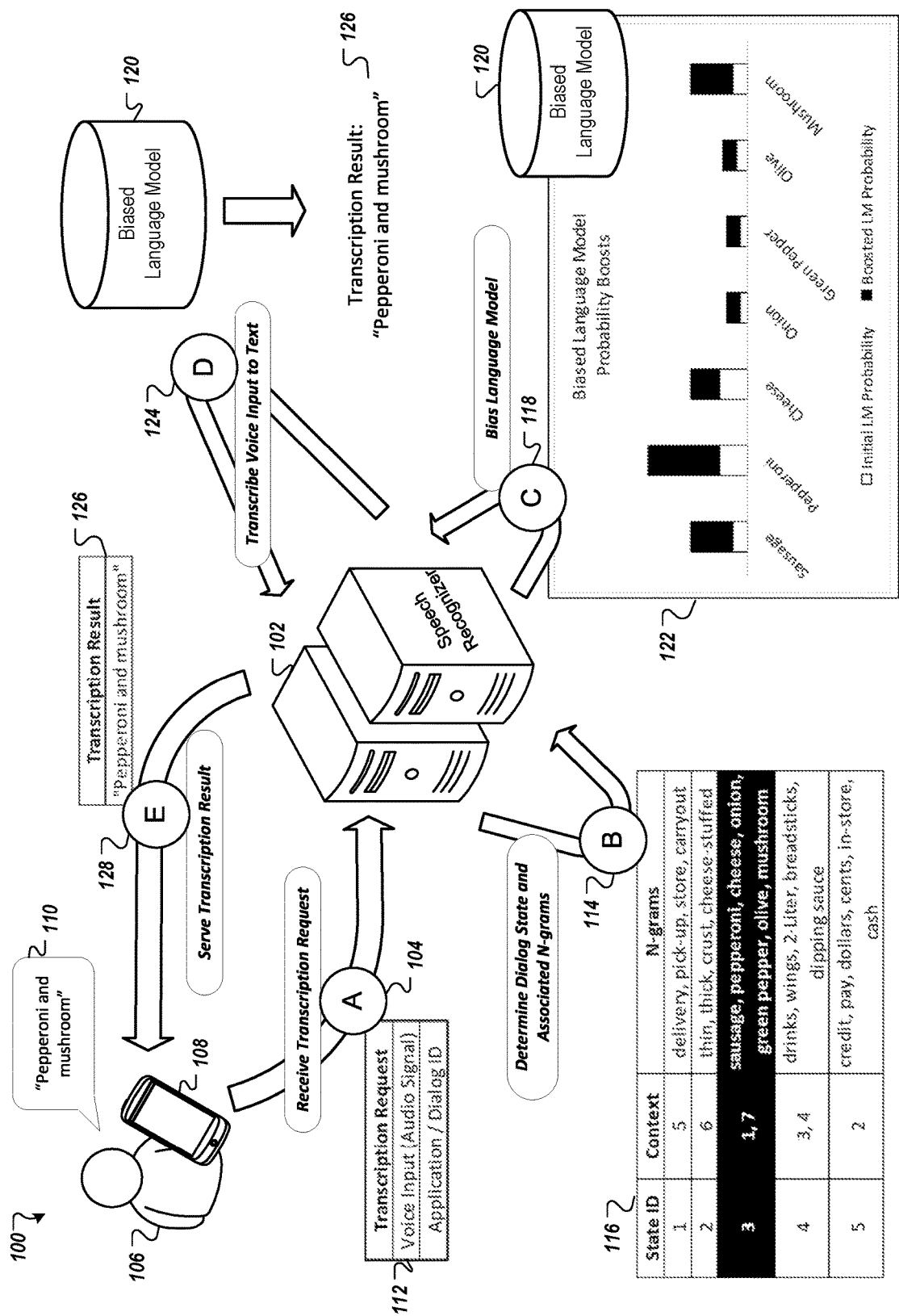
FIG. 1 depicts a conceptual system-flow diagram of an example process for transcribing a voice input to text using a language model that has been biased based on an identified dialog state associated with the voice input.

Referring to FIG. 1, a conceptual diagram is shown of a computing system performing an example process 100 of transcribing a voice input 110 to text using a language model 120 that has been biased based on an identified dialog state that corresponds to the voice input 110. The system includes a speech recognizer 102 in communication with a user device 108. The user device 108 may generally be any type of computing device that is capable of detecting voice inputs from a user. For example, the user device 108 may be a desktop computer, a notebook computer, a smartphone, a tablet computing device, a television or other multimedia device, or a wearable computing device such as a smartwatch. The user device 108 may include a microphone that detects voice input, and software and circuitry (e.g., an analog-to-digital converter) that converts the voice input to digital audio data.

In some implementations, the speech recognizer 102 may be operated on one or more computers that are remote from the user device 108. For example, the speech recognizer 102 may provide a cloud-based speech recognition service that transcribes voice inputs from many different user devices in communication with the speech recognizer 102 over one or more networks (e.g., the Internet). In this way, computing resources at the respective user devices may be conserved due to the speech recognition tasks being offloaded to remote servers with potentially much greater computing power. In some implementations, the speech recognizer 102 may be provided locally on the user device 108 so as to enable speech recognition capabilities even when the user device 108 is offline and a network connection is unavailable.

The process 100 begins when a user 106 provides a voice input 110 to the user's device 108. Before speaking, the user 106 may have activated a mode on the device 108 that enables the device 108 to detect voice inputs and to communicate with the speech recognizer 102 to generate a transcription of detected speech. In the example represented in FIG. 1, the user 106 has spoken the phrase "pepperoni and mushroom." The phrase may be spoken in the context of a multi-stage dialog that the user is engaged in with an application on the device 108 to place an order with a pizza restaurant. For example, the user 106 may select options for his or her pizza order by completing a form presented in a user interface (e.g., a presentation of a web page or native application on the device 108) that includes a collection of input fields (e.g., text fields, drop-down menus, or radio button selectors) for receiving the user's input. In some implementations, the device 108 may allow the user 106 to provide input into each of the fields using different input mechanisms such as typing or voice inputs. With typed input, the user 106 may directly input text into the various fields through a keyboard, whereas with voice inputs, the user 106 dictates the text that is to be provided into the various fields as voice inputs that are converted to text. In some implementations, the user 106 may conduct a dialog with a voice assistant on the device 108 in which the device 108 prompts the user 106 to provide voice inputs in response to a series of questions presented visually and/or aurally to the user 106 (e.g., "What size pizza would you like to order?", "Which toppings would you like on your pizza?", "Would you like to add any sides?").

At operation A (104), upon receiving the voice input 110, the device 108 generates a request 112 for the speech recognizer 102 to transcribe the voice input 110 to text. If the speech recognizer 102 is remote from the user device 108, the transcription request 112 can be transmitted over a network to the speech recognizer 102. The request 112 may include one or more components. Generally, the request will include the digital audio data for the voice input 110. In some implementations, the request 112 may further include context data, an application identifier, a dialog identifier, a dialog state identifier, or a combination of two or more of these. In some implementations, the request 112 may include only the digital audio for the voice input 110 without additional context data, an application identifier, a dialog identifier, or a dialog state identifier.

The context data in the request 112 may generally include any data other than the audio data for the voice input 110 which the speech recognizer 102 may use to determine a transcription. Some types of context data may indicate a condition or state of the user device 108 at or near a time that the voice input 108 was detected by the device 108. As described further below, examples of context data include user account information, anonymized user profile information (e.g., gender, age, browsing history data, data indicating previous queries submitted on the device 108), location information, and a screen signature (i.e., data that indicates content displayed by the device 108 at or near a time when the voice input 110 was detected by the device 108). In some implementations, the application identifier, dialog identifier, and dialog state identifier may be considered as special types of context data, but are discussed separately here by way of example.

An application identifier may be included in the request 112 to identify a particular application, among multiple applications capable of being identified by the speech recognizer 102, to which the voice input 110 was directed. In some implementations, the speech recognizer 102 may store different sets of dialog states or other language model biasing data for different applications, and the application identifier can be used by the speech recognizer 102 to determine the appropriate set of dialog states to use in transcribing the voice input 110. For example, the speech recognizer 102 may store a first set of dialog states and language model biasing data for the pizza ordering application, and a different second set of dialog states and language model biasing data for a banking application. By including the application identifier in the request 112, the speech recognizer 102 can recognize that the request 112 pertains to the pizza ordering application, for example. Accordingly, the first set of dialog states and language modeling biasing data associated with the pizza ordering application can be selected for use in transcribing the voice input 110.

In some implementations, the request 112 to transcribe the voice input 110 may include a dialog identifier. The dialog identifier may indicate a particular dialog, among multiple dialogs, to which the transcription request 112 pertains. In some implementations, the dialog identifier may be used to distinguish among multiple dialogs provided in a single application. For example, the primary dialog of the pizza ordering application may be a dialog for submitting a pizza order. But the application may further provide other dialogs that allow the user to interact with the application in different ways, such as a dialog that allows a user to submit customer feedback or a dialog that allows a user to adjust account settings. The speech recognizer 102 may use the dialog identifier to distinguish the possible dialogs from each other and select appropriate models and parameters for biasing the language model and transcribing the vice input 110.

In some implementations, the request 112 to transcribe the voice input 110 may include a dialog state identifier. The dialog state identifier may indicate a particular dialog state, among multiple dialog states in a given dialog, to which the transcription request 112 pertains. A dialog state is generally a representation of one or more stages of a dialog in which a user provides voice inputs to a computing device. The stages of the dialog can constitute a series of user interactions related to a particular task or activity. For example, a dialog for the activity of ordering a pizza may include stages at which respective voice inputs are received for selecting a pizza size, selecting toppings, specifying a delivery address, and providing payment information. A dialog state may be assigned to each of the stages of the activity, and some dialog states may be assigned to multiple stages. The dialog state identifier may indicate which of the states the voice input 110 is directed to. In some implementations, the dialog state identifier may be a true indication of a dialog state that is used by the speech recognizer 102 to determine a manner for biasing the language model 120. In some implementations, a dialog state "hint" (e.g., in the form of an integer) may be provided that indicates the dialog stage or the device's estimate of the true dialog state. The speech recognizer 102 may trust a dialog state hint or may use other data (e.g., context data, dialog state history data) to verify whether the hint is accurate.

At operation B (114), the speech recognizer 102 processes the request 112 to determine a dialog state associated with the request 112 (and thus associated with the voice input 110). In some implementations, the speech recognizer 102 uses information contained in the request 112 other than the audio data for the voice input 110 to determine the dialog state associated with the request 112. For example, if the request 112 included an application identifier, a dialog identifier, and a dialog state identifier, then all three pieces of information could be used to determine the dialog state. The application identifier may identify a particular application that is associated with a set of one or more dialogs. The dialog identifier may identify which of these dialogs the request 112 is related to, and the dialog state identifier may identify which dialog state within the identified dialog that the request 112 is related to. A dialog state may be determined in some implementations even if none or less than all three of these pieces of information are provided to the speech recognizer 102.

In some implementations, the speech recognizer 102 may use other types of context data to select a dialog state. For example, the request 112 may include a hash value that characterizes the user interface displayed on the device 108 at or near a time that the voice input 110 was provided to the device 108 (i.e., a screen signature). Subsequently, the speech recognizer 102 may compare the hash value received in the request 112 to predetermined hash values that are associated with different dialog states. A particular dialog state associated with a predetermined hash value that matches the hash value received in the request 112 may then be selected as the dialog state that the voice input 110 and request 112 are determined to correspond to. In some implementations, the selection of a dialog state may be based on two or more types of context data (e.g., a screen signature, a dialog state hint, and a location indicator that indicates a geographic location of the device 108 when the voice input 110 was detected). In some implementations, the speech recognizer 102 may select the dialog state by using a classifier that outputs a predicted dialog state based on multiple signals including multiple types of context data. The classifier may be rule based or may be trained by machine-learning processes (e.g., a neural network).

In the example of FIG. 1, a representation of a data structure 116 is depicted that correlates each of a plurality of dialog states with respective context data and a respective set of one or more n-grams (e.g., language model biasing data). In particular, five dialog states are shown that correspond to different stages in the pizza ordering dialog. For example, dialog state '1' relates to the user's preference for a delivery or carry-out option, whereas dialog state '2' relates to the user's preference for a crust type and dialog state '3' relates to the user's preference for pizza toppings. In some implementations, a dialog may include respective prompts at multiple different stages of the dialog that elicit similar responses from users. Each of the different prompts may be associated with different context data, but the speech recognizer 102 may have merged the similar prompts and responses into a single dialog state. For example, a pizza ordering application may include a first prompt that asks the user 106 which toppings to include on the pizza and a second prompt that asks the user 106 if he or she would like to add additional toppings at a discounted price. The device 108 may provide a context value (e.g., dialog state identifier) of '1' in the request 112 for the first prompt and may provide a context value of '7' in the request 112 for the second prompt. But because of the similarity among voice inputs responsive to each of these prompts, the speech recognizer 102 may maintain a single dialog state that corresponds to both prompts.

The data structure 116 identifies a respective set of one or more n-grams that are associated with each dialog state. The set of n-grams associated with a given dialog state generally indicate words, phrases, numbers, or other language units (i.e., n-grams) that frequently occur in voice inputs that have been determined to correspond to given dialog state. For example, the data structure 116 identifies the n-grams "credit," "pay," "dollars," "cents," "in-store," and "cash" as terms that are likely to be uttered by a user in dialog state '5', which relates to payment options for a pizza order. In some implementations, the respective n-grams assigned to each of the dialog states may be determined by the speech recognizer 102 based on analysis of results of previous transcription requests. For example, the speech recognizer 102 (or another computing system) may log transcriptions of voice inputs from many different users over a period of time. A set of most popular terms (n-grams) that occur in the voice input transcriptions may then be determined and correlated with a dialog state. As such, there may be no need for an application developer to provide the speech recognizer 102 with sets of n-grams to associate with each dialog state. Rather, the speech recognizer 102 may determine the sets of n-grams automatically by analysis of historical transcription results. In some implementations, the set of n-grams associated with a given dialog state may include a combination of n-grams determined automatically without input from an application developer along with other n-grams that are specified by the application developer.

At operation C (118), the process 100 uses the set of n-grams associated with the selected dialog state to bias a language model 120 used by the speech recognizer 102 to transcribe the voice input 110 to text. Generally, the language model 120 is configured to determine likelihoods (e.g., probabilities) that a language sequence represents an accurate transcription of a voice input. For example, the language model 120 may process a sequence of phonemes or other speech features generated by an acoustic model of the speech recognizer 102 to determine one or more candidate transcriptions of the voice input 110. The language model 120 may assign a probability to each of the candidate transcriptions indicating a likelihood that the respective candidate transcription is an accurate transcription of the voice input. The top n candidate transcriptions may then be returned to the user device 108 as transcription results, where n is a predetermined integer (e.g., 1, 2, 3, 4, or more).

In some implementations, the language model 120 may determine the probability for a candidate transcription based on probability data that indicates how frequently different sequences of terms occur in one or more corpora of language data. For example, the language model 120 may assign a higher score to a transcription of "three blind mice" than "tree blind mice" because the former language sequence occurs more frequently in a corpus of search queries than does the latter. In some implementations, the language model 120 may be an n-gram language model that uses conditional probabilities to successively predict terms in a language sequence based on n or n-1 preceding terms in the sequence, where n is a predetermined integer (e.g., 1, 2, 3, 4, or more).

The speech recognizer 102 may bias the language model 120 so as to increase or decrease the likelihood that a transcription result for the voice input 110 includes n-grams from the set of n-grams associated with the selected dialog state. In some implementations, the language model 120 may be biased to favor candidate transcriptions that include n-grams from the set of n-grams assigned to the selected dialog state. For example, the bar chart 122 in FIG. 1 shows a probability "boost" applied to each of the n-grams associated with the selected dialog state (3), which relates to pizza toppings. Thus, whereas an unbiased language model may assign a probability score of 0.20 to the candidate transcription "pepperoni and mushroom", the biased language model may assign a probability score of 0.85, thus indicating a high likelihood that the candidate transcription accurately represents the content of the user's voice input 110.

In some implementations, even though probability data stored by the language model 120 may be increased with respect to a set of n-grams associated with a selected dialog state, the biased language model 120 may still be capable of generating transcriptions that do not include n-grams within the selected set (or that at least include one or more n-grams outside of the selected set). However, the likelihood of generating a transcription with the biased language model 120 that does not include n-grams from the selected set of n-grams may be diminished as compared to the likelihood of generating a transcription with the unbiased language model that does not include such n-grams. In some implementations, the language model 120 may be biased by decreasing probabilities associated with n-grams for a selected dialog state. In some implementations, a given dialog state may be associated with a first set of n-grams that have increased probabilities in the biased language model 120 and a second set of n-grams that have decreased probabilities in the biased language model 120.

At operation D (124), the speech recognizer 102 uses the biased language model 120 to determine one or more transcription results for the voice input 110. In some implementations, a top-ranked transcription result 126 (e.g., "pepperoni and mushroom"), which the biased language model 120 indicates is likely the most accurate transcription of the voice input 110, can be selected and returned to the user device 108 in response to the request 112 (operation E (128)). The user device 108 may then input the transcription result as text into a form field, for example.

Figure 2:
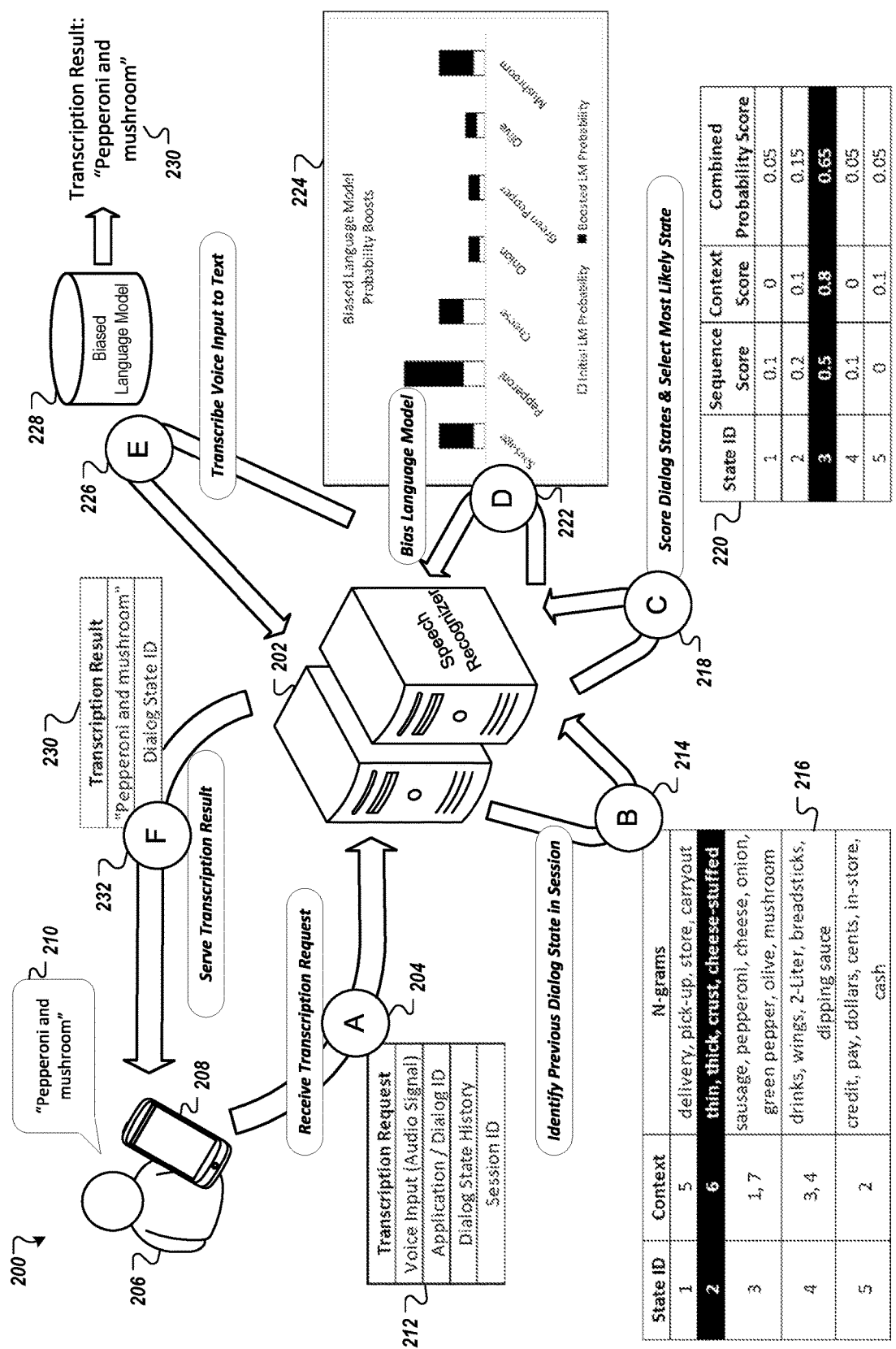
FIG. 2 depicts a second conceptual system-flow diagram of an example process for transcribing a voice input to text using a biased language model. The language model represented in FIG. 2 is biased based on n-grams associated with a particular dialog state that the system identifies based on one or more dialog states that preceded the voice input.

FIG. 2 is a conceptual diagram of a computing system performing an example process 200 of transcribing a voice input 210 to text using a biased language model 228. The process 200 is similar to the process 100 of FIG. 1, but in the process 200 dialog state history data is used at least in part to determine a dialog state that corresponds to the voice input 210. Generally, dialog state history data identifies one or more dialog states that have previously occurred in a dialog session of a given user. In some cases, dialog state history data may identify a dialog state that immediately preceded the dialog state for a new transcription request. The speech recognizer 102 can then evaluate a dialog state-flow model to predict the dialog state for a new transcription request based on the indication of which dialog state immediately preceded the voice input for the new request. In some implementations, as described in the following paragraphs, dialog state history data may be used alone (i.e., without other context data) to determine the dialog state associated with a transcription request. In some implementations, multiple signals, including from both context data and dialog state history data, may be used together by the speech recognizer 102 to determine the dialog state associated with a transcription request.

At operation A (204), the user's device 208 generates a transcription request 212 and transmits the request 212 to the speech recognizer 202. The request 212 includes audio data that characterizes the voice input 210 detected by the device 208. In this example, the voice input 210 is a recording of the user's utterance "pepperoni and mushroom." The request 212 may or may not include other data usable by the speech recognizer 202 to transcribe the voice input 210. In some implementations, the request 212 may further include an application identifier, a dialog identifier, a dialog state identifier, other context data, dialog state history data, a session identifier, or a combination of two or more of these. In some implementations, the request 212 may include dialog state history data that identifies the last n dialog states that have occurred in the dialog session. The speech recognizer 202 may make dialog state history data available to the user device 208 by exposing an application programming interface (API) to the device 208 or by providing an indication of the dialog state identifier that corresponds to a given request to the user device 208 along with the transcription result 230 that request. For example, the user device 208 may submit a first transcription request to the speech recognizer 202, and in response, the speech recognizer 202 provides to the user device 208 a transcription result and the dialog state identifier associated with the first request. Subsequently, the user device 208 may submit a second transcription request to the speech recognizer 202 that includes, as part of dialog state history data, the dialog state identifier associated with the first (preceding) request. The dialog state identifier associated with the first request can then be used by the speech recognizer 202, along with a dialog state-flow model, to determine a dialog state associated with the second request, as further described below.

In some implementations, the request 212 may include a dialog session identifier in addition to or alternatively to dialog state history data. The dialog session identifier is data that indicates a particular dialog session associated with the request 212. The dialog session identifier may be used by the speech recognizer 202 to correlate a series of transcription requests that relate to a same dialog session. For example, a first transcription request that includes a dialog session identifier may be sent from the user device 208 to the speech recognizer 202. The speech recognizer 202 may determine a dialog state associated with the first transcription request and may store a record that associates the determined dialog state with the session identifier. When the speech recognizer 202 later receives a second transcription request that includes the same session identifier, the speech recognizer 202 can access the stored record to identify the preceding dialog state that was associated with the first request. Based on the preceding dialog state and a dialog state-flow model, the speech recognizer 202 can determine the dialog state associated with the second request and store a record that correlates the second dialog state with the session identifier. The speech recognizer 202 can continue this process to successively determine subsequent dialog states for subsequent transcription requests based on preceding dialog states in a same session.

At operation B (214), upon receiving the request 212, the speech recognizer 202 identifies the dialog state that the speech recognizer 202 determined as being associated with the last transcription request that was received from the user device 208 for the same dialog session. For example, in completing a pizza order, the user 206 may provide a succession of voice inputs such as "carryout," then "thin crust," and then "pepperoni and mushroom," which are provided in successive transcription requests to the speech recognizer 202. In response to receiving the third request 212, the speech recognizer 202 may identify that the dialog state associated with the preceding request in the same dialog session as dialog state '2' (highlighted in chart 216). In some implementations, the speech recognizer 202 may determine the preceding dialog session by correlating a dialog session identifier included in the request 212 with information stored by the speech recognizer 202 that indicates the last one or more dialog states determined for the same dialog session. In some implementations, the speech recognizer 202 may determine the preceding dialog state based on dialog state history data contained in the request 212 that directly identifies the preceding state.

At operation C (218), the speech recognizer 202 determines the dialog state that is most likely associated with the transcription request 212 (and thus most likely associated with the voice input 110 included in the request 212). In some implementations, the dialog state can be determined based on the one or more preceding dialog states that were identified at operation B (214) and a dialog state-flow model. A dialog state-flow model generally indicates a sequence of dialog states that are expected to occur in a given dialog, and is described with here with reference to FIG. 3.

Figure 3:
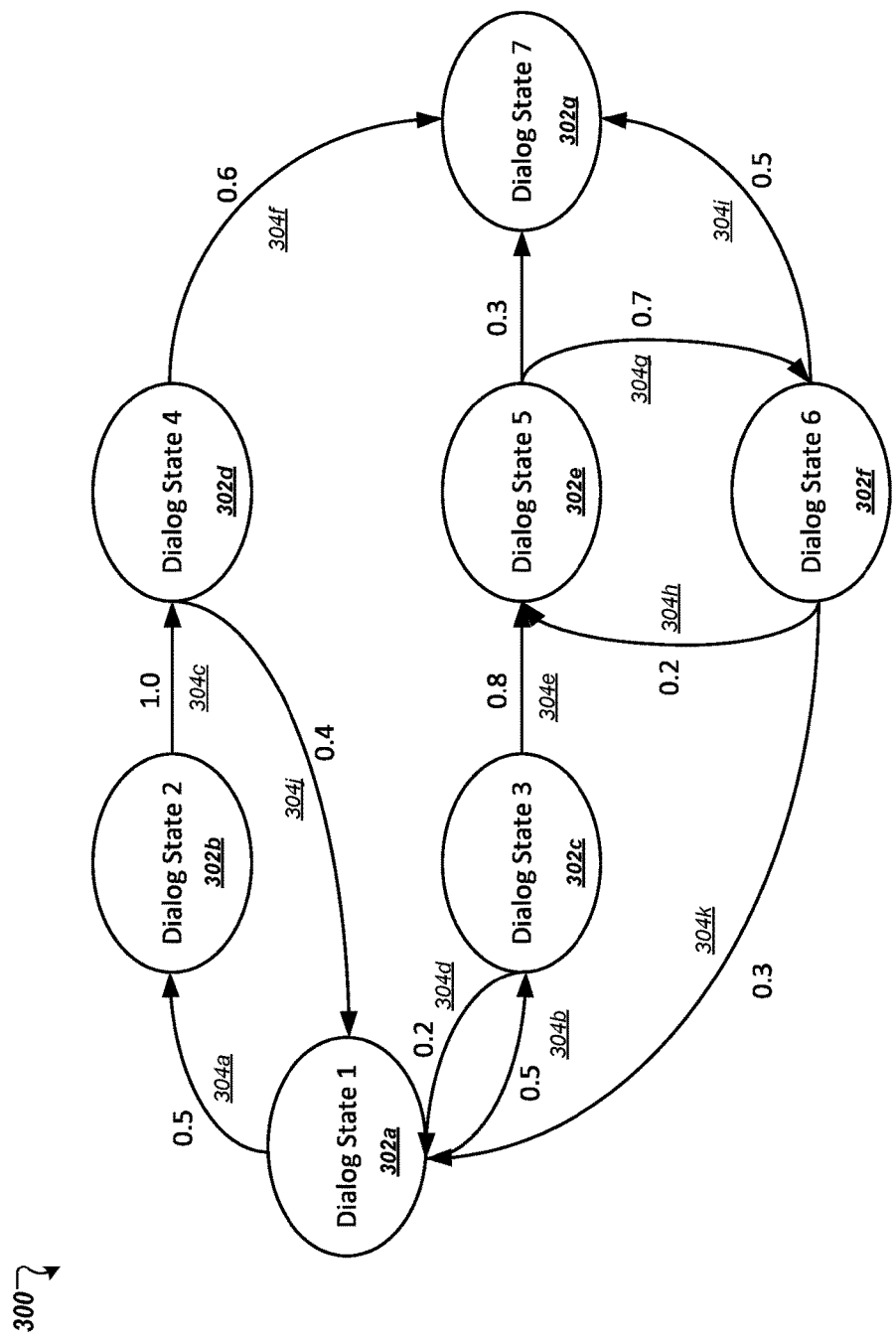
FIG. 3 is a graph that represents an example dialog state-flow model. The graph includes nodes that correspond to a plurality of dialog states and directional edges that correspond to transitions between particular dialog states.

FIG. 3 depicts a conceptual representation of an example dialog state-flow model. The dialog state-flow model is represented as a graph 300 that includes a plurality of nodes 302*a*-*g* and a plurality of edges 304*a*-I that connect different ones of the nodes 302*a*-*g*. Each respective dialog state in the dialog represented by the model is represented by a respective node 302*a*-*g* in the graph 300. The edges 304*a*-I represent candidate transitions between dialog states. For example, the node 302*a* (representing a first dialog state) has two outbound arrows 304*a* and 304*b* that point to nodes 302*b* (representing a second dialog state) and 302*c* (representing a third dialog state), respectively. Thus, according to the model, it is possible that the dialog state that follows the first dialog state 302*a* may be either the second dialog state 302*b* or the third dialog state 302*c*. However, because no edges point from the node 302*a* for the first dialog state to the respective nodes for the fourth, fifth, sixth, or seventh dialog states (302*d*-*g*), it may not be possible for the dialog to flow from the first dialog state to these other dialog states.

In some implementations, the dialog state-flow model may assign probabilities to the transitions among each pair of dialog states represented in the model. For example, the model indicates that there is an equal probability of either the second or third dialog states 302*a*, 302*b* following the first dialog state 302*a*. However, the likelihood of the dialog returning to the first dialog state 302*a* immediately after the fourth dialog state 302*d* is only forty percent, whereas the likelihood that the dialog would proceed from the fourth dialog state 302*d* to the seventh dialog state 302*g* is sixty percent. In some implementations, the dialog state-flow model can be automatically learned by the speech recognizer or another computing system based on analyses of the sequences of dialog states that occurred across many dialog sessions from one or more user devices over time. In some implementations, the dialog state-flow model may be manually defined by a user, such as an application developer that developed a given dialog. In some implementations, a speech recognizer may be capable of accessing and using respective models for each of a plurality of dialogs.

Referring again to FIG. 2 and the discussion of operation C (218), a dialog state may, in some implementations, be determined for the voice input 210 (and request 212) based on respective scores that are determined for a set of dialog states that indicate the likelihood of each respective dialog state matching the request 212 or voice input 210. Example scores for the set of five dialog states associated with the pizza ordering dialog are shown in table 220. In some implementations, the speech recognizer 202 selects the dialog state that has the highest probability score. In the example of FIG. 2, dialog state '3', which corresponds to the pizza toppings selection stage of the dialog, has the highest probability score and is determined to be the dialog state that corresponds to transcription request 212.

In some implementations, the dialog state probability scores may further be based on context data associated with the request 212. The speech recognizer 202 may compare context data included in the request 212 with respective context data associated with each of the dialog states to determine a respective context similarity score for each of the dialog states. Generally, a higher context similarity score indicates a closer match between the context data in the request 212 and the context data associated with a given dialog state. In some implementations, the context similarity score can be based on a weighted combination of similarity scores among multiple types of context data, such as user interface hashes, location data, and user profile data. In some implementations, the final probability score assigned to each of the dialog states (shown, for example, in the far-right column of table 220) can be based on a weighted combination of the context similarity score and a sequence score. The sequence score may be derived from the probabilities in a dialog state-flow model and may indicate the probability of a dialog state given one or more preceding dialog states.

At operations D (222), E (226), and F (232), the process 200 proceeds in a manner similar to operations C (118), D (124), and E (128) of the process 100 depicted in FIG. 1. In particular, at operation D (222), the language model 228 is biased based on the set of n-grams associated with the dialog state that was selected during operation C (218). At operation E (226), the speech recognizer 202 generates a transcription result 230 of the voice input 110 using the biased language model 228. Finally, at operation F (232), the transcription result 230 is served from the speech recognizer 202 to the user device 208. In some implementations, the transcriptions result 230 can be served to the device 208 in conjunction with a dialog state identifier, which the device 208 may include in a subsequent transcription request in a dialog session for use by the speech recognizer 202 to determine the next dialog state.

Figure 4:
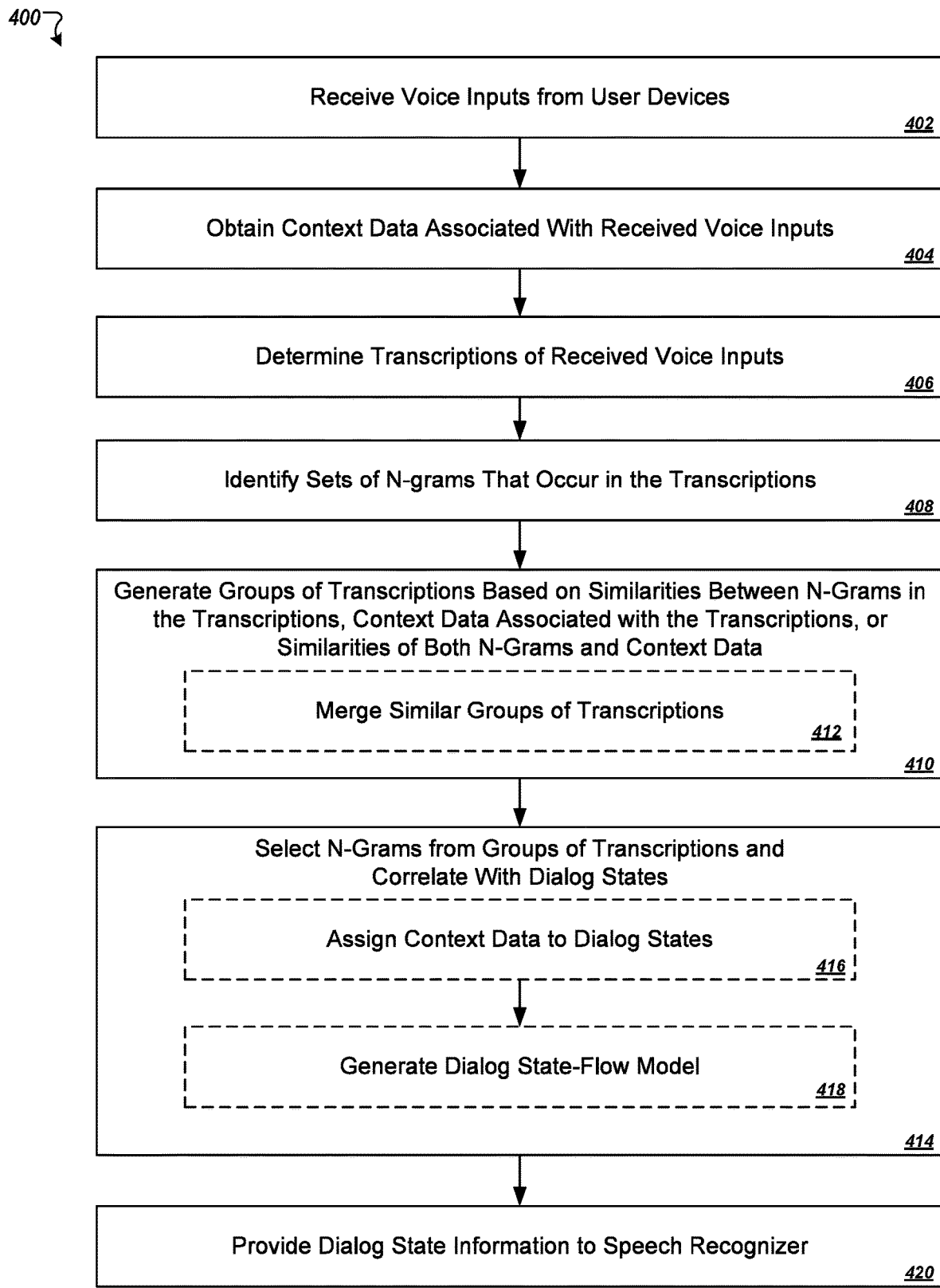
FIG. 4 is a flowchart of an example process for determining dialog states and respective sets of n-grams associated with the dialog states based on analysis of historical voice input or transcription records.

Referring now to FIG. 4, a flowchart is shown of an example process 400 for analyzing transcriptions of voice inputs to determine dialog states in a multi-interaction voice dialog. In some implementations, a respective set of n-grams may be assigned to each of the dialog states and these n-gram sets may later be used by a speech recognizer at runtime to bias a language model. For example, probability data associated with the n-grams for a given dialog state may be adjusted in a language model responsive to a determination that a voice input corresponds to the given dialog state. In some implementations, the process 400 may be employed by a speech recognition system to automatically learn dialog states for a dialog and to automatically learn how to bias a language model for each dialog state. Accordingly, in some implementations, an application that uses a speech recognition service of the speech recognition system need not keep track of the flow of dialog states during a given series of voice interactions with a user, and need not explicitly inform the speech recognition system of the dialog state that a given transcription request corresponds to, the set of n-grams that are to be used in biasing a language model for a given transcription request, or both.

At stage 402, a computing system receives audio data that indicates voice inputs of users from a plurality of computing devices. The voice inputs are generally utterances spoken by users as part of a dialog. For each user, the dialog may include a series of voice inputs that relate to a particular activity. For example, the dialog for an appointment scheduling activity may include respective voice inputs that identify the starting time, duration, location, description, and invitees of an appointment. In some cases, users may provide input for all available appointment scheduling parameters. In other cases, users may provide input for only a portion of the available appointment scheduling parameters. Additionally, the order that the parameters are provided in voice inputs may vary among users. Thus, even though the voice inputs may all pertain to dialogs for a same activity (e.g., appointment scheduling), the number and sequence of voice inputs may vary across dialog sessions. In some implementations, the computing system may receive voice inputs that correspond to multiple different dialogs. Because the process 400 generally relates to determining the dialog states and n-gram sets for a particular dialog (e.g., appointment scheduling), the system may filter the received data to include only data for voice inputs that correspond to that dialog. Data for voice inputs that correspond to other dialogs (e.g., pizza ordering, financial transactions, social media posting) may be discarded.

At stage 404, the computing system optionally identifies context data associated with the received voice inputs. In some implementations, the context data may be provided by user devices in transcription requests to the computing system. The transcription requests may also include the audio data for the voice inputs that are requested to be transcribed. Context data generally includes any data (other than voice input audio data) that the speech recognizer is capable of using to determine a transcription of the voice input. For example, a user device may compute a screen signature that characterizes the display of a user interface on the device at or near the time the device detects a voice input. The screen signature may in some instances be a hash value determined based on values associated with user interface elements that were displayed by a device at or near the time the device detects a voice input. The screen signature (or other individual pieces of context data) may or may not be sufficient for the computing system to determine a dialog state associated with a voice input. In some implementations, a given voice input can be associated with a single piece of context data (e.g., a screen signature). In some implementations, a voice input can be associated with multiple pieces of context data (e.g., a screen signature and a dialog hint). A dialog hint is a type of context data that indicates the user device's estimated dialog state. If the user device reliably keeps track of dialog states during a dialog, then the dialog hint may effectively serve as a dialog state identifier. If the user device does not reliably keep track of dialog states, then the computing system may afford the dialog hint less weight in determining a dialog state associated with the user device. In some implementations, the computing system may not identify context data associated with the received voice inputs and may determine dialog states and n-grams sets without context data.

At stage 406, the system determines transcriptions of the received voice inputs (or at least of the voice inputs that have been filtered for analysis). The transcriptions may be determined by a speech recognizer that converts voice inputs to text. The speech recognizer may include a collection of components that enable the conversion of audio data for the voice inputs to text. A language model may be included among these components, which is generally configured to determine probabilities of sequences of terms in a language. The language model may evaluate candidate sequences of terms for a transcription and select a most probable sequence of terms as the transcription that is ultimately provided as output by the speech recognizer. In some implementations, a general, unbiased language model may be used to determine transcriptions of the voice inputs during stage 406 since the dialog states and language model biasing data (e.g., n-grams sets) may not yet have been determined by this stage of the process 400. In some implementations, the computing system may simply obtain transcriptions of voice inputs that were determined by one or more other computing systems without itself needing to receive the audio data of the voice inputs and generating the transcriptions as part of the process 400.

At stage 408, the computing system analyzes the transcriptions of the voice inputs to identify respective sets of one or more n-grams that occur in each of at least some of the transcriptions. The respective set of n-grams identified for each transcription may be provided in a vector that represents the transcription. The vector may indicate the respective set of n-grams identified for each transcription without regard to the order that the n-grams occurred in the transcription. In some implementations, every n-gram that occurs in a transcription may be identified and added to the corresponding vector for that transcription. In some implementations, only a proper subset of all the n-grams that occur in a transcription may be identified and added to the corresponding vector for that transcription. The subset of n-grams may be selected, for example, based on prominence scores associated with the n-grams. For example, n-grams that occur less frequently in a language may be assigned a higher prominence score, while n-grams that occur more frequently in a language (e.g., pronouns, articles, common adjectives and nouns) may be assigned a lower prominence score. N-grams that are assigned prominence scores that exceed a threshold score may be selected for inclusion in the transcription's vector, for example, or the n-grams having the top n prominence scores in a transcription may be selected (where n is a predefined integer such as 1, 2, 3, 4, or more).

At stage 410, the computing system generates groups of transcriptions based on similarities among the transcriptions. Notably, this description refers to groups of transcriptions by way of example only. Because each transcription corresponds to just a single voice input and a single set of n-grams identified as occurring in the transcription, the computing system could equally generate groups of voice inputs or groups of n-gram sets based on similar techniques to those described herein for generating groups of transcriptions. The discussion here relating to groups of transcriptions thus applies to these other types of groups as well.

In some implementations, the transcriptions may be grouped based on semantic similarities of n-grams occurring in the transcriptions. For example, in determining groups of transcriptions of voice inputs to an appointment scheduling application, a first group of transcriptions may be formed among transcriptions having n-grams relating to appointment times (e.g., "noon," "12 pm," "8:30 am," "in the evening," "4 pm"); a second group of transcriptions may be formed among transcriptions having n-grams relating to appointment locations (e.g., "conference room," "coffee shop," "downtown," "office," "avenue," "street," "floor," "suite"); and a third group of transcriptions may be formed among transcriptions having n-grams relating to appointment descriptions (e.g., "meeting," "lunch," "teleconference," "review," "party"). In some implementations, the semantic similarities of transcriptions may be determined by identifying one or more topics associated with the n-grams in a given transcription. The topics may be identified by a named-entity recognition engine, for example, that associates n-grams with topics and that can label text samples with topics based on the n-grams found in the text samples. Once the topics are determined, transcriptions that relate to one or more same topics may be grouped. In some implementations transcriptions that relate to topics that are different but similar may be grouped.

In some implementations, the transcriptions may be grouped based on similarities among the identified context data associated with the voice inputs from which the transcriptions were derived. For example, a first group of transcriptions may be formed among transcriptions of voice inputs having a first screen signature, a second group of transcriptions may be formed among transcriptions of voice inputs having a second screen signature, and so on. In another example, a first group of transcriptions may be formed among transcriptions of voice inputs spoken at times within a first time period (e.g., 8 AM-12 PM), a second group of transcriptions may be formed among transcriptions of voice inputs spoken at times within a second time period (e.g., 12:01 PM-4 PM), and so on. Groups may be also be formed based on other types of matching or similar context data, such as location data, user profile data, user demographic data, dialog hints, or indications of one or more applications running on a device when the spoken input was detected, for example. In some implementations, transcriptions may be grouped based on similarities among multiple types of context associated with the voice inputs from which the transcriptions were derived. For example, groups of transcriptions may be formed among transcriptions of voice inputs having similarities in both screen signatures and periods of time in which the voice inputs were detected at a user device. In some implementations, different types of context data may be weighted relative to each other such that similarities among certain types of context are more likely to impact groupings than other types of context.

In some implementations, the groups of transcriptions may be generated based on semantic similarities of n-grams occurring in the transcriptions, and not based on context data associated with the voice inputs from which the transcriptions were derived. In some implementations, the groups of transcriptions may be generated based on context data associated with the voice inputs from which the transcriptions were derived, and not based on semantic similarities of n-grams occurring in the transcriptions. However, in some implementations, the groups of transcriptions may be generated based on both (i) semantic similarities of n-grams occurring in the transcriptions and (ii) context data associated with the voice inputs from which the transcriptions were derived. In the latter implementations, transcriptions that are both semantically similar and that have similar context data may be grouped together, for example. Thus, transcriptions having n-grams that are only slightly similar semantically may be grouped if their contexts are very similar, and transcriptions having context that are only slightly similar may be grouped if they are highly semantically related.

In some implementations, after the computing system generates an initial set of groups of transcriptions, groups that are determined to be similar may be merged to reduce the overall number of groups of transcriptions. The final set of transcription groups generated by the computing system correspond to respective dialog states that are determined to occur in a dialog. Since each dialog state may be used by a speech recognizer to bias a language model differently, consolidating groups to reduce the number of dialog states that are detectable by the speech recognizer may be beneficial. In particular, merging groups can eliminate redundant groups and increases separation among the groups (and, thus diversity among the dialog states) to ensure meaningful differences in how a language model is biased as between each of the dialog states. For example, a first stage of a dialog may solicit users' voice inputs for appointment starting times, a second stage of a dialog may solicit users' voice inputs for appointment ending times, and a third stage of a dialog may solicit users' voice inputs for a number of attendees to the appointment. Because there may be substantial overlap among n-grams in the voice inputs at each of these stages (e.g., statement of numbers and times), the transcriptions of the voice inputs may be merged into a single group. The determined dialog state that results from the merged group may thus correspond to three separate stages of voice interactions because the same set of n-grams may be used to effectively bias a language model in a same way for each of these stages.

The computing system may identify groups of transcriptions to merge according to various techniques. In some implementations, a set of n-grams from each group may be compared to a respective set of n-grams from each other group, and similarity scores between the sets of n-grams of each pair of groups can be determined based on the comparisons. If the similarity score between the n-grams in a given pair of groups satisfies (e.g., exceeds) a threshold similarity score, then the groups may be merged. A result of the merger can be a group that includes all or at least some of the transcriptions from each of the merged groups. The similarity score may be determined, for example, based on a number or frequency of matches between n-grams of the groups being compared. For example, if an initial context-based grouping of transcriptions resulted in a first group for a first screen signature value and a second group for a second screen signature value, but the transcriptions of voice inputs among each of the groups are largely the same, the groups may be merged into a single group in the final set of groups generated by the computing system. In some implementations, groups may be merged in successive iterations until a limit is reached (e.g., until a predetermined number of iterations have been completed, until none of the similarity scores between the groups satisfies the threshold similarity score, until the number of groups remaining does not exceed a predetermined maximum number of groups, or a combination of these). In some implementations, the similarity score between groups of transcriptions may be determined by taking the cosine distance between the respective sets of n-grams from each of the groups. The cosine distance may be calculated by generating vectors of n-grams from each group (e.g., according to a bag-of-words technique), and determining the distance among the vectors. In some implementations, the similarity score between groups of transcriptions may be determined by taking the sets of n-grams to a low-dimensional space and determining a similarity in the low-dimensional space.

Figure 5:
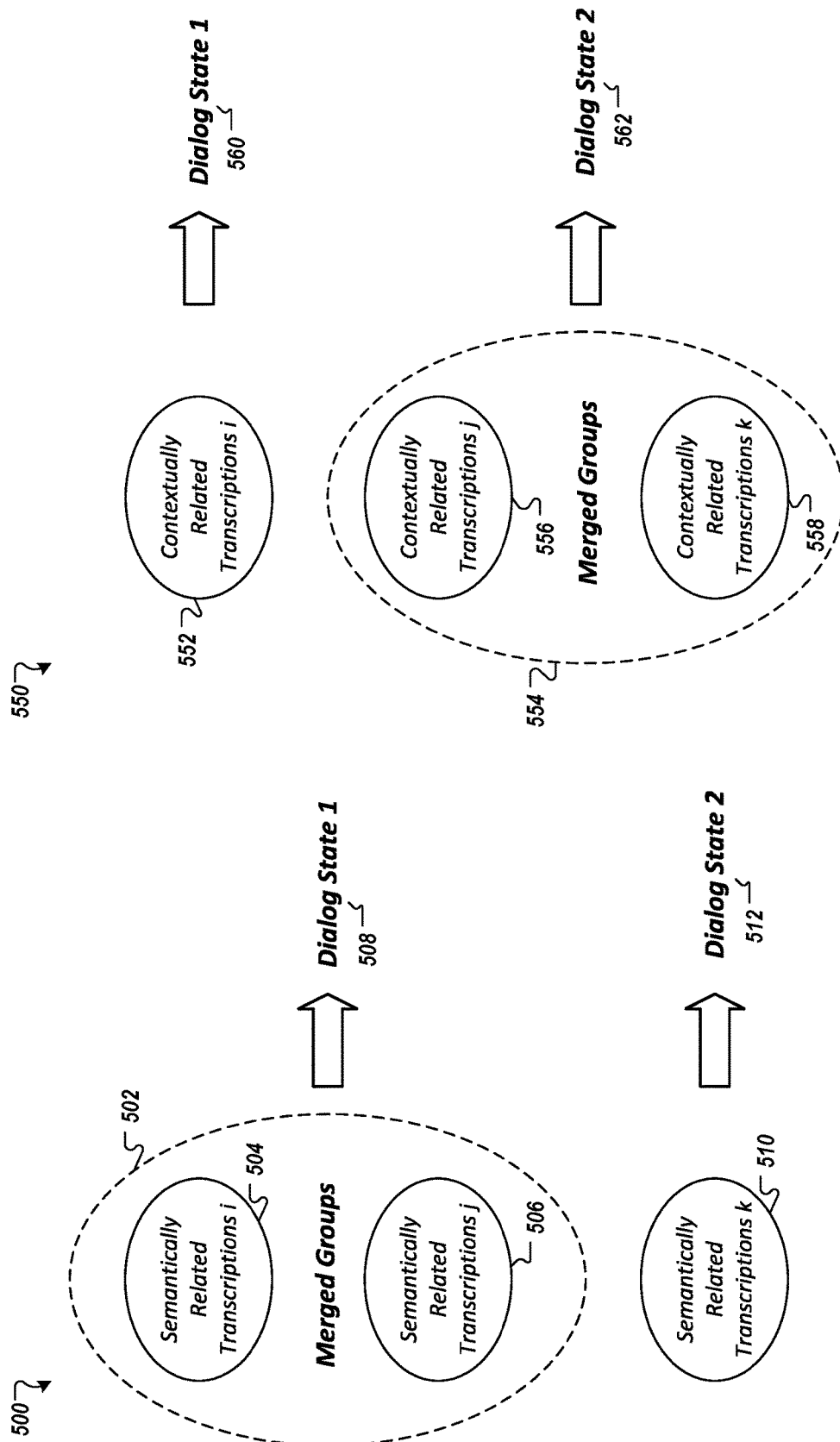
FIGS. 5A and 5B are conceptual diagrams of techniques for merging similar groups of transcriptions to form a final set of groups that correspond to dialog states determined to occur in a dialog.

FIGS. 5A and 5B depict conceptual diagrams of techniques for merging similar groups of transcriptions to form a final set of groups that correspond to dialog states determined to occur in a dialog.

In FIG. 5A, initial groups of transcriptions 504, 506, and 510 are grouped based on the semantic similarity of terms (n-grams) in the transcriptions. This type of grouping may be beneficial, for example, when context data is unavailable or where the speech recognizer is configured to use a dialog state-flow model, rather than context data, to detect dialog states of voice input transcription requests at runtime. After the initial groups 504, 506, and 510 are generated, two of the groups 504 and 506 are determined to contain similar sets of n-grams and are therefore merged into a single group 502. The merged group 502 and the third initial group 510 are then correlated to respective dialog states 508 and 512 in a given dialog.

In FIG. 5B, initial groups of transcriptions 552, 556, and 558 are grouped based on context data associated with the transcriptions (and thus associated with the voice inputs from which the transcriptions were determined). Contextual grouping may be beneficial, for example, when context data has a strong correlation to dialog states will be available to a speech recognizer to transcribe voice inputs during runtime. In some implementations, dialog states determined based on context may obviate any need for a speech recognizer to determine dialog states based on dialog state history data or a dialog state-flow model, for example. After the initial groups 552, 556, and 558 are generated, two of the groups 556 and 558 are determined to contain similar sets of n-grams and are therefore merged into a single group 554. The merged group 554 and the first initial group 552 are then correlated to respective dialog states 560 and 562 in a given dialog.

Referring again to FIG. 4, at stage 414 the process 400 assigns, to each of the dialog states determined at stages 410 and 412, a respective set of n-grams for a speech recognizer to use in biasing a language model when transcribing a voice input that corresponds to the respective dialog state. In some implementations, the set of n-grams assigned to a given dialog state can be selected from among all the n-grams that occur in the transcriptions that comprise the group corresponding to the given dialog state. In some implementations, a count of a number of times that each n-gram occurs in the group of transcriptions can be determined, and the most frequently occurring n-grams may be selected based on the counts (e.g., n-grams having counts that satisfy a threshold count may be selected and/or a predetermined number of n-grams having the highest counts may be selected). In some implementations, the selected n-grams may be selected from among a filtered set of n-grams that, for example, excludes insignificant terms (e.g., "of," "the," "a," "to," "for," etc.). The selected sets of n-grams can be stored in association with their respective dialog states.

In some implementations, where the groups of transcriptions have been created based at least in part on context data associated with the transcriptions, at stage 416 the computing system may assign, to each of the dialog states determined at stages 410 and 412, a respective set of context data that may be used by a speech recognizer to associate a given voice input or transcription request with the respective dialog state. The set of context data assigned to a given dialog state may be analogized to a fingerprint that uniquely identifies the dialog state. Thus, when a speech recognizer receives a voice input transcription request that includes context data, the context data from the request may be compared to the respective sets of context data assigned to each of the dialog states. If a match or strong correlation is determined between the context data in the request and one of the assigned sets of context data, then speech recognizer may identify that the request pertains to the dialog state that corresponds to the matching set of context data. In some implementations, the set of context data that the computing system assigns to a dialog state may be based on the context data associated with all or some of the transcriptions in the group that corresponds to the dialog state. For example, if a significant plurality or a majority of the transcriptions in a given group are associated with a first screen signature value, then the first screen signature value may be assigned to the dialog state corresponding to that group.

In some implementations, the computing system at stage 418 can determine a dialog state-flow model that indicates sequences of dialog states that are likely to occur in a dialog session. In some implementations, the dialog state flow model may indicate, for each dialog state determined in stages 410 and 412, probabilities that one or more other dialog states will be the next dialog state in a dialog session. For example, in the flow model depicted in FIG. 3, the probability of dialog state 7 following dialog state 4 is 0.6 and the probability of dialog state 1 following dialog state 4 is 0.4. The probabilities of any other dialog states following dialog state 4 is zero. In some implementations, the computing system may determine the dialog state-flow model based on identified sequences of dialog states that occurred in records of historical dialog sessions. For example, if in the records of historical dialog sessions a first dialog state was followed by a second dialog state eighty-percent of the time and followed by a third dialog state twenty-percent of the time, then a probability of 0.8 may be assigned in the dialog state-flow model to the transition from the first dialog state to the second dialog state and a probability of 0.2 may be assigned to the transition from the first dialog state to the third dialog state.

Figure 6:
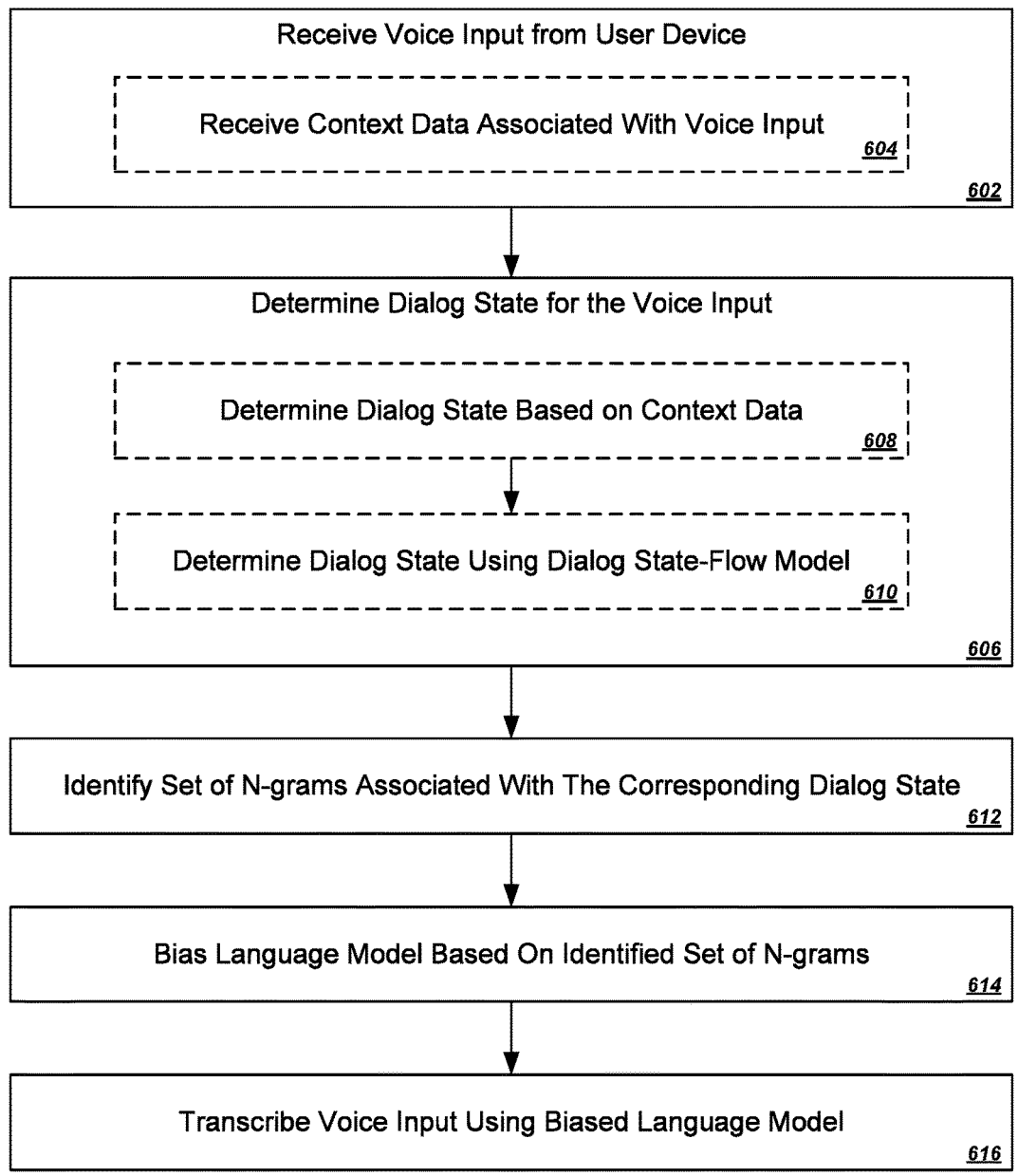
FIG. 6 is a flowchart of an example process for performing speech recognition using a biased language model that is selected based on a dialog state associated with the recognized voice input.

FIG. 6 is a flowchart of an example process 600 for performing speech recognition on a voice input using a biased language model that is selected based on a dialog state associated with the voice input. In some implementations, the process 600 may be carried out by a speech recognition computing system such as the speech recognizers described in FIGS. 1 and 2. The process 600 may also be performed using data determined in the process 400 of FIG. 4 about dialog states, n-grams, context data, and dialog state-flow models.

At stage 602, the speech recognition system receives a voice input that is requested to be transcribed. In some implementations, the system at stage 602 also receives context data associated with the voice input. The context data can indicate a condition of a user device that detected the voice input at or near a time that the voice input was detected. For example, the context data may indicate a screen signature that characterizes a display of the user device when the voice input was detected, a dialog hint, or combinations of these and other types of context data.

At stage 606, the speech recognition system analyzes the voice input, the context data, or both to determine a dialog state for the voice input. In some implementations, the dialog state can be determined by matching context data in a transcription request to a particular set of context data that has been stored and correlated with the corresponding dialog state (stage 608). In some implementations, the dialog state can be determined based on dialog state history data and a dialog state-flow model that predicts sequences of dialog states. The dialog state history data may indicate one or more dialog states that preceded the dialog state for the current transcription request, and may be pre-stored by the speech recognition system or may be the provided in a transcription request from a user device.

At stage 612, the speech recognition system identifies a set of n-grams that have been assigned to the dialog state that was determined at stage 606. At stage 614, the identified set of n-grams are applied to bias a language model. For example, probabilities associated with n-grams in the identified set of n-grams may be increased in the language model to make the language model more likely to select the assigned n-grams. In some implementations, the language model may be biased after the voice input is received and the dialog state for the voice input determined. In some implementations, the speech recognition system may generate biased language models for each of the dialog states before a voice input is received. Later, when a request to transcribe a voice input is received, the speech system may access the pre-biased language model corresponding to the dialog state for the voice input. At stage 616, the voice input can be transcribed to text using the biased language model. The transcribed text can then be transmitted to the computing device that requested the transcription.

Figure 7:
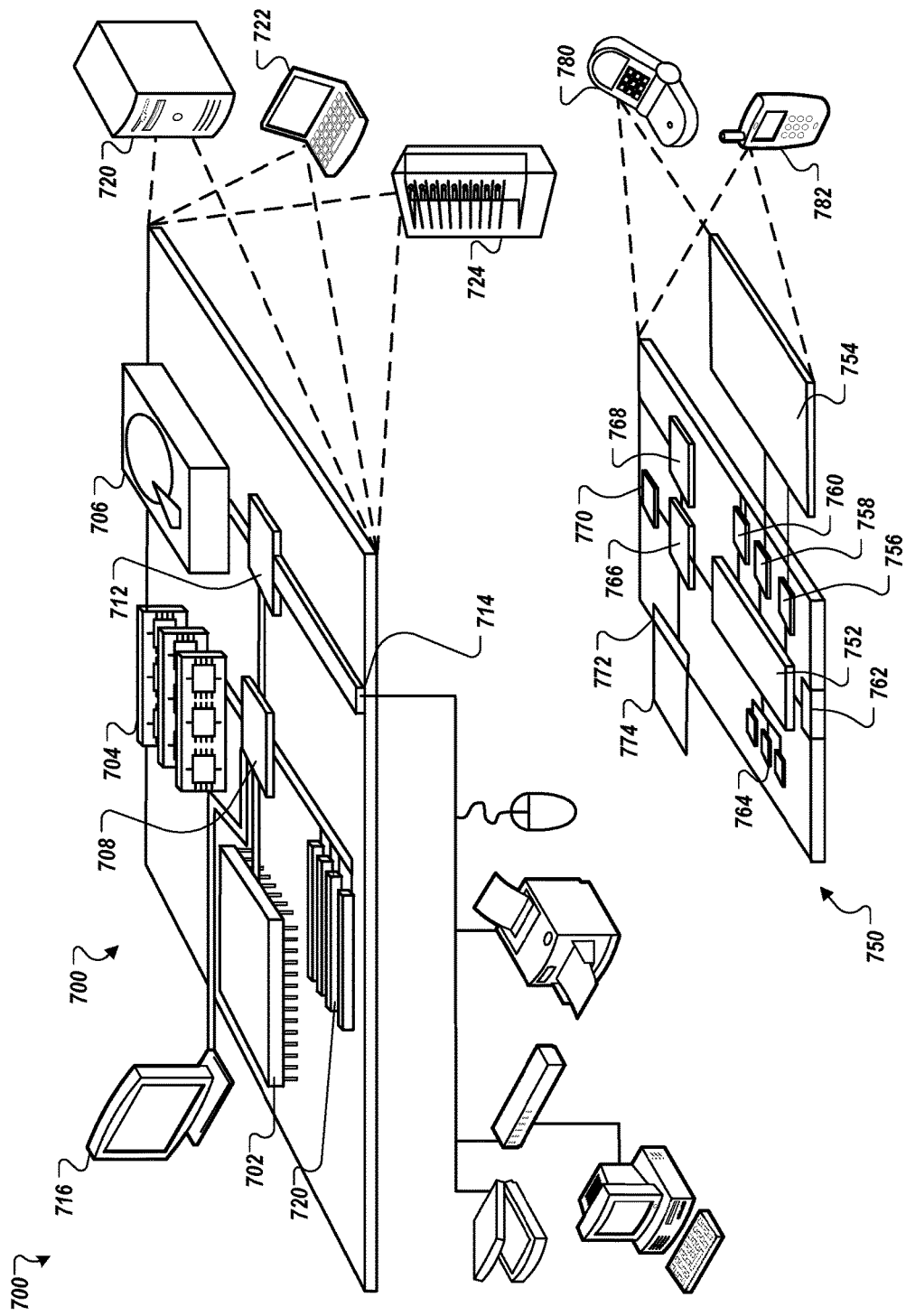
FIG. 7 shows examples of a computing device and a mobile computing device that may be used to perform the computer-implemented methods and other techniques described herein.

FIG. 7 shows an example of a computing device 700 and a mobile computing device that may be used to implement the computer-implemented methods and other techniques described herein. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

In situations in which the systems, methods, devices, and other techniques here collect personal information (e.g., context data) about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method that when executed on data processing hardware causes the data processing hardware to perform operations comprising:
   receiving a transcription request for a voice input captured by a user device, the transcription request comprising audio data and context data, the audio data indicating the voice input and the context data indicating:
      an application to which the voice input is directed; and
      a particular stage from a multi-stage voice activity corresponding to a series of user interactions related to a task of the application;
   based on the context data, determining, from among multiple possible dialogs, a particular dialog corresponding to the particular stage from the multi-stage voice activity;
   based on the particular dialog corresponding to the particular stage from the multi-stage voice activity, filtering the audio data to only include audio data associated with the particular dialog;
   identifying, from a set of n-grams, a representative subset of n-grams associated with the particular dialog corresponding to the particular stage from the multi-stage voice activity based on one or more prior stages from the multi-stage voice activity corresponding to one or more prior transcription requests, each n-gram of the set of n-grams comprising a respective non-zero probability score;
   biasing a language model by increasing the respective non-zero probability score for each n-gram of the identified representative subset of n-grams associated with the particular dialog; and
   processing, using the biased language model, the filtered audio data to generate a transcription of the voice input.

2. The method of claim 1, wherein the identified representative subset of n-grams associated with the particular dialog corresponding to the particular stage from the multi-stage voice activity is further based at least on n-grams in the representative subset of n-grams occurring frequently in historical voice inputs that correspond to the particular dialog.

3. The method of claim 1, wherein the operations further comprise:
   generating an initial transcription of the voice input using the language model prior to biasing the language model,
   wherein determining the particular dialog corresponding to the particular stage from the multi-stage voice activity is further based on the initial transcription.

4. The method of claim 1, wherein the operations further comprise:
   receiving display data associated with a user interface of the user device at a time the voice input was captured by the user device,
   wherein determining the particular dialog corresponding to the particular stage from the multi-stage voice activity is further based on the received display data.

5. The method of claim 1, wherein the multi-stage voice activity comprises an application-specific task for the application to which the voice input is directed.

6. The method of claim 1, wherein the data processing hardware resides on the user device.

7. The method of claim 1, wherein the operations further comprise biasing the language model by decreasing the respective non-zero probability score for each other n-gram not included in the identified representative subset of n-grams.

8. The method of claim 1, wherein the language model comprises an n-gram language model.

9. The method of claim 1, wherein the user device comprises a multimedia computing device.

10. The method of claim 1, wherein the user device comprises a wearable computing device.

11. A system comprising:
data processing hardware; and
memory hardware in communication with the data processing hardware and storing instructions that when executed on the data processing hardware causes the data processing hardware to perform operations comprising:
  receiving a transcription request for a voice input captured by a user device, the transcription request comprising audio data and context data, the audio data indicating the voice input and the context data indicating:
    an application to which the voice input is directed; and
    a particular stage from a multi-stage voice activity corresponding to a series of user interactions related to a task of the application;
  based on the context data, determining, from among multiple possible dialogs, a particular dialog corresponding to the particular stage from the multi-stage voice activity;
  based on the particular dialog corresponding to the particular stage from the multi-stage dialog, filtering the audio data to only include audio data associated with the particular dialog;
  identifying, from a set of n-grams, a representative subset of n-grams associated with the particular dialog corresponding to the particular stage from the multi-stage voice activity based on one or more prior stages from the multi-stage voice activity corresponding to one or more prior transcription requests, each n-gram of the set of n-grams comprising a respective non-zero probability score;
  biasing a language model by increasing the respective non-zero probability score each n-gram of the identified representative subset of n-grams associated with the particular dialog; and
  processing, using the biased language model, the filtered audio data to generate a transcription of the voice input.

12. The system of claim 11, wherein the identified representative subset of n-grams associated with the particular dialog corresponding to the particular stage from the multi-stage voice activity is further based at least on n-grams in the representative subset of n-grams occurring frequently in historical voice inputs that correspond to the particular dialog.

13. The system of claim 11, wherein the operations further comprise:
  generating an initial transcription of the voice input using the language model prior to biasing the language model,
  wherein determining the particular dialog corresponding to the particular stage from the multi-stage voice activity is further based on the initial transcription.

14. The system of claim 11, wherein the operations further comprise:
  receiving display data associated with a user interface of the user device at a time the voice input was captured by the user device,
  wherein determining the particular dialog corresponding to the particular stage from the multi-stage voice activity is further based on the received display data.

15. The system of claim 11, wherein the multi-stage voice activity comprises an application-specific task for the application to which the voice input is directed.

16. The system of claim 11, wherein the data processing hardware resides on the user device.

17. The system of claim 11, wherein the operations further comprise biasing the language model by decreasing the respective non-zero probability score for each other n-gram not included in the identified representative subset of n-grams.

18. The system of claim 11, wherein the language model comprises an n-gram language model.

19. The system of claim 11, wherein the user device comprises a multimedia computing device.

20. The system of claim 11, wherein the user device comprises a wearable computing device.

* * * * *